(12) United States Patent
Krishnan et al.

(10) Patent No.: US 10,817,517 B2
(45) Date of Patent: Oct. 27, 2020

(54) SYSTEM FACILITATING USER ACCESS TO ENTERPRISE RELATED DATA AND METHODS THEREOF

(71) Applicant: BOOMI, INC., Round Rock, TX (US)

(72) Inventors: Ravikiran Krishnan, San Mateo, CA (US); Ayush Parashar, Foster City, CA (US); Deepak Chandrasekar, San Mateo, CA (US); Christopher Pedrotti, San Mateo, CA (US)

(73) Assignee: Boomi, Inc., Round Rock, TX (US)

( * ) Notice: Subject to any disclaimer, the term of this patent is extended or adjusted under 35 U.S.C. 154(b) by 166 days.

(21) Appl. No.: 15/847,802

(22) Filed: Dec. 19, 2017

(65) Prior Publication Data

US 2018/0218042 A1      Aug. 2, 2018

Related U.S. Application Data

(63) Continuation-in-part of application No. 15/690,193, filed on Aug. 29, 2017.

(60) Provisional application No. 62/452,905, filed on Jan. 31, 2017.

(51) Int. Cl.
| | | |
|---|---|---|
| *G06F 16/00* | (2019.01) | |
| *G06F 16/2455* | (2019.01) | |
| *G06F 16/248* | (2019.01) | |
| *G06F 16/2457* | (2019.01) | |
| *G06F 16/332* | (2019.01) | |
| *G06F 16/25* | (2019.01) | |

(52) U.S. Cl.
CPC ........ *G06F 16/2455* (2019.01); *G06F 16/248* (2019.01); *G06F 16/2457* (2019.01); *G06F 16/25* (2019.01); *G06F 16/3322* (2019.01)

(58) Field of Classification Search
CPC ............. G06F 16/2455; G06F 16/2457; G06F 16/248; G06F 16/25; G06F 16/3322
See application file for complete search history.

(56) References Cited

U.S. PATENT DOCUMENTS

| | | | |
|---|---|---|---|
| 9,026,918 B2 | 5/2015 | Sharoni | |
| 9,251,498 B2 | 2/2016 | Khasnis et al. | |
| 9,740,754 B2 | 8/2017 | Roy et al. | |
| 2008/0228671 A1 | 9/2008 | Nagaraj | |
| 2013/0275164 A1* | 10/2013 | Gruber ................... G10L 17/22 705/5 |
| 2014/0379699 A1 | 12/2014 | Blyumen | |
| 2015/0339484 A1 | 11/2015 | Shah et al. | |

(Continued)

*Primary Examiner* — Diedra McQuitery
(74) *Attorney, Agent, or Firm* — Krishnendu Gupta; Sean Evans

(57) ABSTRACT

A method and system for facilitating user access to enterprise related data are provided. A catalog of data and metadata is generated from enterprise related data stored in a plurality of data stores. A user interface (UI) is displayed on an electronic device associated with a user. The UI is configured to provide a plurality of query options to query the catalog of data and metadata. At least one query option is configured to enable the user to provision a query to a virtual assistant associated with the UI. The query provided by the user using a query option is received, and a processing of the query is facilitated. A display of a response is caused on the UI based on the processing of the query. The response is selected from among a plurality of response options.

16 Claims, 8 Drawing Sheets

(56) References Cited

U.S. PATENT DOCUMENTS

| | | | |
|---|---|---|---|
| 2015/0365527 A1* | 12/2015 | Chakravarthy | H04M 3/493 |
| | | | 455/411 |
| 2017/0091780 A1 | 3/2017 | Kannan | |
| 2017/0180284 A1* | 6/2017 | Smullen | H04L 67/322 |
| 2018/0129648 A1* | 5/2018 | Chakravarthy | G06N 3/006 |
| 2019/0034813 A1* | 1/2019 | Das | G06N 5/04 |
| 2019/0057147 A1* | 2/2019 | Bursik | G06F 16/35 |

\* cited by examiner

FIG. 8

SEARCH 🔍 WHAT IS [MIN] OF COL1|

POPULAR KEYWORDS: [COL 11] [COL 123] [DATASET] [JOB 11] [JOB 10]

23 ANSWERS FOR MIN OF 'COL1' FOUND

WHAT IS [MINIMUM] OF COL 1?
12345
810

WHAT IS [MINIMUM] OF COL 11?
24336
812

WHAT IS [MINIMUM] OF COL 123?
43165
814

WHAT IS [MINIMUM] OF JOB 1?
9876543210
816

WHAT IS [MINIMUM] OF JOB 11?
78.45
818

WHAT IS [MINIMUM] OF JOB 123?
21343664.45
820

LOAD MORE

PEOPLE ALSO ASK FOR

WHAT IS [MAX] OF DATASET 1?
12345
☆ 👁 52

WHAT IS [HISTOGRAM] OF DATASET 1?
[histogram]
12345
☆ 👁 52

WHAT IS [AVERAGE] OF DATASET 1?
99.45
☆ 👁 52

VIEW MORE 43

100 RESULTS FOR 'COL1' FOUND        ✕ 822

ALL(100)  DATASETS (32)  JOBS(24)  ...  SORT BY ▼

▢ BANKS DEMO DATA

▤ BANKS_JOBS

▦ BANKS_WORKFLOW

▦ BANKS_SCHEDULE

▦ BANKS_SCHEDULE

⋮

800

SYSTEM FACILITATING USER ACCESS TO ENTERPRISE RELATED DATA AND METHODS THEREOF

TECHNICAL FIELD

The present invention generally relates to information retrieval mechanisms and more specifically to a system and method for facilitating user access to enterprise related data.

BACKGROUND

Enterprise data universe may encompass structured and unstructured data stored in a plurality of data stores spread across various locations. Some non-exhaustive examples of data stores include on-premise data stores, cloud-based data stores, networked storage systems, and the like.

The data stores may store a variety of data, such as for example customer data, product information, employee information, financial data, and the like. Such data is typically embodied in various formats, such as spreadsheets, relational database objects, text files, and the like.

Retrieving information from the data stores has been a challenging task due to existence of various structures and formats associated with the individual data stores. Further, each data store may be associated with a respective User Interface (UI) for accessing the data stored therein. An enterprise user may have to get acquainted with several features of one or more UIs to access data stored in the corresponding data stores. As a result, a cognitive burden on the user may increase due to interfacing with the multiple user interfaces and systems. In some example scenarios, the user may also have to learn a programming language or seek assistance from an Information Technology (IT) support personnel within the enterprise to retrieve desired information from a data store.

Further, each request for accessing data may result in a list of possible responses that satisfy the user request. Usually, the user may need to sift through the responses to identify desired information. Although some existing techniques make use of algorithms to improve a relevancy of the responses, the user may still have to sift through the relevant responses manually to identify the desired information. As such, these techniques fail to reduce a time and effort required by the user to identify and retrieve the desired information. Furthermore, the user may prefer to receive the information in a desired format. Existing systems are designed to provide the possible responses in a specified manner and any alteration in the presentation of responses may require a change in the existing systems itself. Incorporating such a change may result in an increase in hardware cost and in time and effort involved in retrieving the desired information.

Accordingly, there is a need to reduce the cognitive burden on the user and preclude the need for the user to interact with several UIs to access enterprise related data. Further, there is a need to provide user access to enterprise related data stored across multiple data stores in a convenient and hassle-free manner and in a format desired by the user.

SUMMARY

Various embodiments of the present disclosure provide systems and method for facilitating user access to enterprise related data.

An example method includes generating a catalog of data and metadata from enterprise related data stored in a plurality of data stores by a processing engine. The method includes causing display of a user interface (UI) on an electronic device associated with a user by the processing engine. The UI is configured to provide a plurality of query options to query the catalog of data and metadata. At least one query option from among the plurality of options is configured to enable the user to provision a query to a virtual assistant associated with the UI. The method further includes receiving the query provided by the user using a query option from among the plurality of query options by the processing engine. The method includes facilitating a processing of the query received from the user by the processing engine. The method further includes causing display of a response on the UI based on the processing of the query by the processing engine. The response is selected by the processing engine from among a plurality of response options.

An example information retrieval system includes a knowledge base, at least one processing engine and a memory. The knowledge base is configured to comprise enterprise related data imported from a plurality of data stores related with an enterprise. The at least one processing engine is communicably coupled with the knowledge base. The memory stores therein machine executable instructions, that when executed by the at least one processing engine, cause the information retrieval system to generate a catalog of data and metadata from the enterprise related data stored in the knowledge base. The information retrieval system causes display of a user interface (UI) on an electronic device associated with a user. The UI is configured to provide a plurality of query options to query the catalog of data and metadata. At least one query option from among the plurality of options is configured to enable the user to provision a query to a virtual assistant associated with the UI. The information retrieval system is caused to receive the query provided by the user using a query option from among the plurality of query options and facilitate processing of the query received from the user. The information retrieval system is further caused to display a response on the UI based on the processing of the query. The response is selected by the processing engine from among a plurality of response options.

Another example information retrieval system includes a knowledge base, a catalog generator, a display module, a communication module and a query processing module. The knowledge base is configured to comprise enterprise related data imported from a plurality of data stores related with an enterprise. The catalog generator is configured to generate a catalog of data and metadata from the enterprise related data stored in the knowledge base. The display module is configured to cause display of a user interface (UI) on an electronic device associated with a user. The UI is configured to provide a plurality of query options to query the catalog of data and metadata. At least one query option from among the plurality of options is configured to enable the user to provision a query to a virtual assistant associated with the UI. The communication module is communicably coupled with the display module and configured to receive the query provided by the user using a query option from among the plurality of query options. The query processing module is communicably coupled with the communication module and configured to facilitate a processing of the query received from the user. The display module is configured to cause display of a response on the UI based on the processing of the query. The response is selected from among a plurality of response options.

Other aspects and example embodiments are provided in the drawings and the detailed description that follows.

BRIEF DESCRIPTION OF THE FIGURES

For a more complete understanding of example embodiments of the present technology, reference is now made to the following descriptions taken in connection with the accompanying drawings in which:

FIG. 8 shows a representation of a UI for illustrating provisioning of a response to a user query input, in accordance with an example embodiment of the invention;

Figure 1:
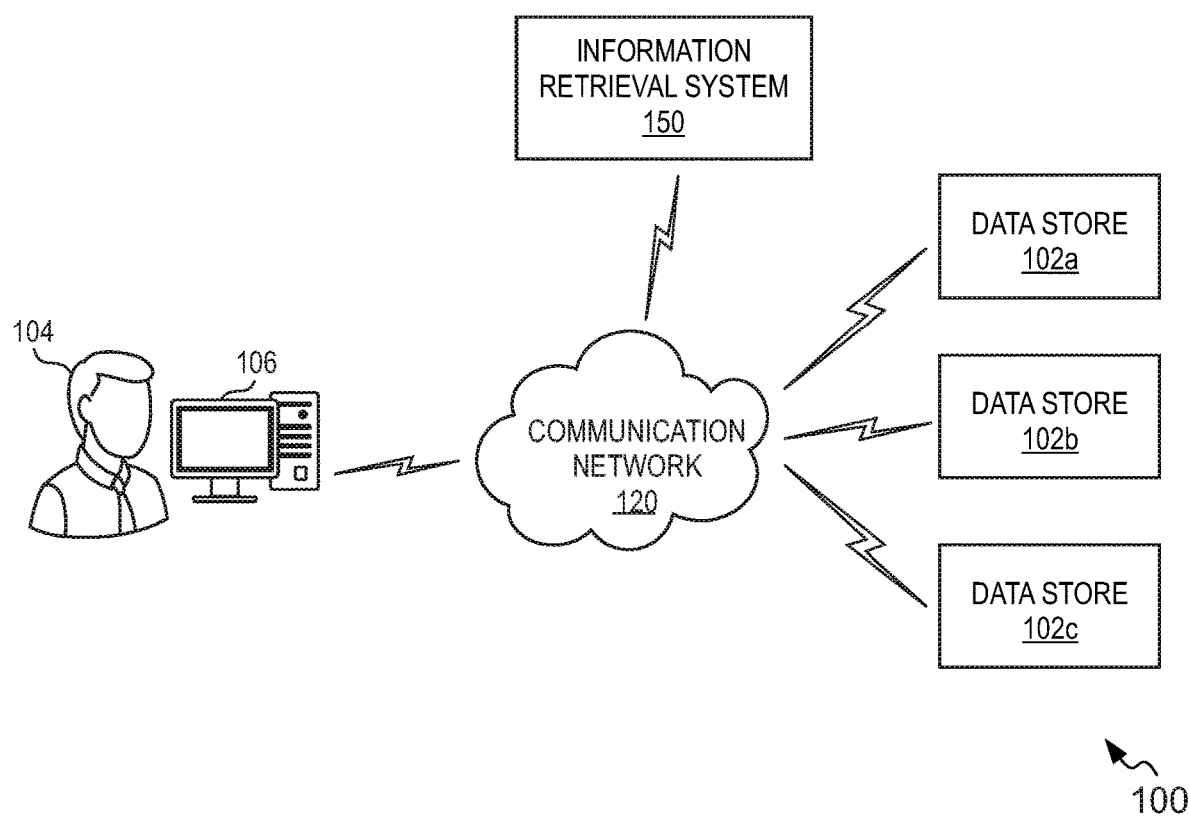
FIG. 1 illustrates an environment in which various embodiments of the present invention may be practiced.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Overview

Retrieving information from the data stores has been a challenging task due to existence of various structures and formats associated with the individual data stores. Further, each data store provides a respective User Interface (UI) for accessing the data stored therein, which may increase a cognitive burden on the user due to interfacing with the multiple user interfaces and systems. Various embodiments of the present invention provide a system and method for facilitating user access to enterprise related data that are capable of overcoming the aforementioned drawbacks and providing additional advantages.

In one embodiment, the system is configured to retrieve or import enterprise related data from multiple data stores in the enterprise data universe. The imported data configures a knowledge base. The system generates a catalog of data and metadata from the data stored in the knowledge base. The system is further configured to cause display of a user interface (UI), which the user can use to query the catalog of data and metadata and thereby request desired information from the knowledge base. Thus, the UI serves as the single integrated means to access enterprise related data stored in a plurality of data stores. Further, the UI is configured to provide the user with multiple options to provision queries to access the data. For example, an option on the UI may be provided to enable the user to provide a natural language typed input corresponding to the query. Similarly, the UI may provide an option to provision the query in conversational speech form, an option to provision the query to a virtual assistant and an option to provision a click-based request for information. In addition to provisioning multiple options to access data, the UI is equipped with a plurality of response options to provide the response to the user's queries. As the UI provides multiple access and multiple response means for information retrieval, enterprise related data may be accessed in a convenient and hassle-free manner and in a format desired by the user. Further, in at least one embodiment, the response provided to the user may be configured to take into account user's preferences and may be personalized based on the user's preferences. Further, recommendations may also be provided to the user to enhance the user's experience of interacting with the system. Exemplary systems and processes for facilitating user access to enterprise related data are explained with reference to FIGS. 1 to 11.

FIG. 1 illustrates an environment 100 in which various embodiments of the present invention may be practiced. The environment 100 depicts a plurality of data stores, such as data store 102*a,* data store 102*b* and data store 102*c* storing structured and unstructured data related to an enterprise data universe. The term 'enterprise' as used herein may refer to a public corporation, a private firm, a public-private partnership venture, an institution, a non-governmental organization or any such an entity. For example, the enterprise may correspond to a listed E-commerce company. In another illustrative example, the enterprise may correspond to a private equity (PE) firm. In yet another illustrative example, the enterprise may correspond to a state-owned banking enterprise. Some non-limiting examples of data stores 102a, 102b and 102c include an on-premise data server, a relational database, a cloud server, a social media platform, and the like. It is noted that these data stores may correspond to any public or private data source in the enterprise data universe. The term 'enterprise related data' as used hereinafter refers to any information associated with the enterprise. Some non-exhaustive examples of the enterprise related data include customer data, product information, employee information, financial data, and the like.

The environment 100 depicts an enterprise user 104 using an electronic device 106 to access information stored in a data store from among the plurality of data stores. In at least one example embodiment, an enterprise user, such as the enterprise user 104, may correspond to an information technology (IT) professional, a data scientist, a business analyst such as for example a retention analyst, a risk analyst or a marketing executive, or any such individual within the enterprise tasked with analyzing enterprise data for performing a variety of tasks, such as identifying trends, obtaining actionable insights, checking key metrics, and the like. It is noted that the electronic device 106 is depicted to be a desktop computer for illustration purpose. The enterprise user 104 may use any electronic device, such as a laptop computer, a tablet computer, a workstation, a Smartphone, a cellular phone, a wearable device, and the like to access information stored in a data store over a communication network 120. Examples of the communication network 120 may include wired networks, wireless networks or a combination thereof. Examples of the wired networks may include Ethernet, local area networks (LAN), fiber-optic cable networks and the like. Examples of the wireless networks may include cellular networks like GSM/3G/4G/CDMA networks, wireless LAN, blue-tooth or Zigbee networks and the like. An example of a combination of the wired and wireless networks may include the Internet. It is understood that several enterprise users, such as the enterprise user 104 may access information stored in the plurality of data stores over the communication network 120.

The environment 100 further depicts an example representation of an information retrieval system 150. The information retrieval system 150 is hereinafter referred to as system 150. The system 150 is configured to facilitate user access to enterprise related data stored in multiple data stores, such as data stores 102a-102c. More specifically, the system 150 is configured to provide a single integrated user interface (UI), which the user can use to access the enterprise related data stored in multiple data stores. As the information from multiple data stores can be accessed using single integrated UI, an enterprise user such as the enterprise user 104, may not need to be interact with several UIs to retrieve desired information. Moreover, the system 150 is configured to provide multiple access and multiple response means for information retrieval, thereby enabling the user to receive information in the form desired by the user. The various components of the system 150 are explained next with reference to FIG. 2.

Figure 2:
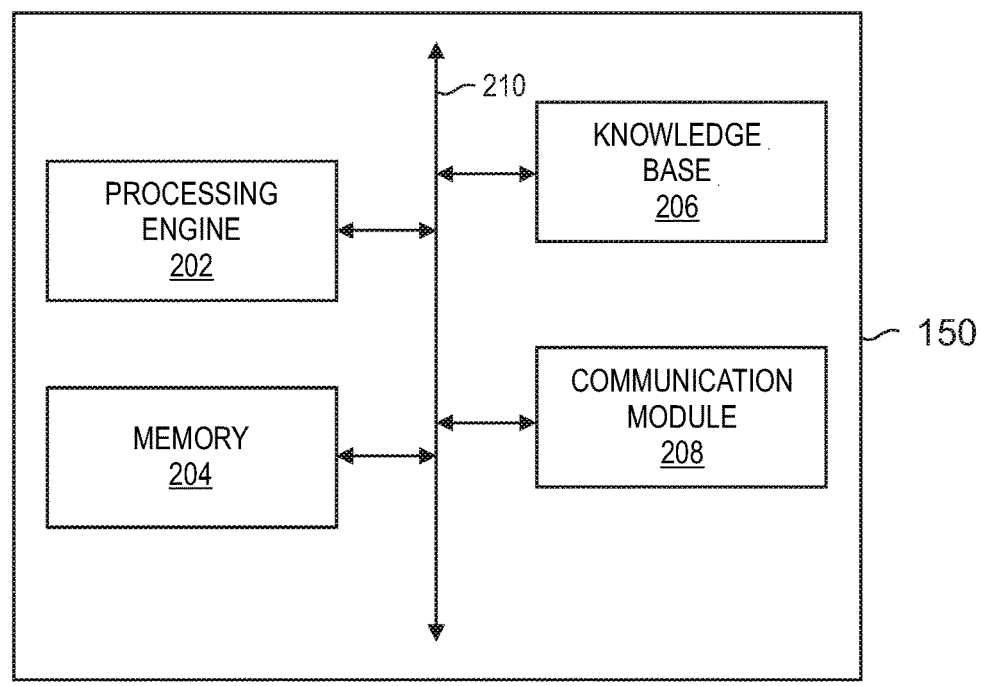
FIG. 2 is a block diagram of a system configured to facilitate user access to enterprise related data, in accordance with an example embodiment of the invention.

FIG. 2 is a block diagram of the system 150 of FIG. 1 configured to facilitate user access to enterprise related data, in accordance with an example embodiment of the invention. In at least one example embodiment, the system 150 is embodied as software platform capable of being accessed via a communication network, such as the communication network 120 (shown in FIG. 1). In an embodiment, the software platform may be implemented as a set of software layers on top of existing hardware systems. In an embodiment, the system 150 may be implemented as a standalone component in a remote machine, such as cloud based server or a Web server, connected to a communication network 120 and capable of executing a set of instructions (sequential and/or otherwise) to facilitate user access to enterprise related data. Moreover, the system 150 may be implemented as a centralized system, or, alternatively, the various components of the system 150 may be deployed in a distributed manner while being operatively coupled to each other. In an embodiment, one or more functionalities of the system 150 may also be embodied as a client within devices, such as electronic devices of enterprise users. In another embodiment, the system 150 may be a central system that is shared by or accessible to each of such devices. In some embodiments, the system 100 may be embodied as a hybrid of a semantic web and a multi-layered, self-organized, context-dependent, artificial neural net. It is noted that in at least some embodiments, as part of data access, the system 150 may be configured to facilitate data integration (i.e. integrating data imported from multiple data stores), data cataloging (i.e. creating datasets from imported data) and data preparation (i.e. visually representing data).

The system 150 is depicted to include at least one processing engine such as the processing engine 202, a memory 204, a database referred to hereinafter as knowledge base 206 and a communication module 208. In an embodiment, the memory 204 is capable of storing machine executable instructions, referred to herein as platform instructions. Further, the processing engine 202 is capable of executing the platform instructions. In an embodiment, various components of the system 150, such as the processing engine 202, the memory 204, the knowledge base 206 and the communication module 208 are configured to communicate with each other via or through a centralized circuit system 210. The centralized circuit system 210 may be various devices configured to, among other things, provide or enable communication between the components (202-208) of the system 150. In certain embodiments, the centralized circuit system 210 may be a central printed circuit board (PCB) such as a motherboard, a main board, a system board, or a logic board. The centralized circuit system 210 may also, or alternatively, include other printed circuit assemblies (PCAs) or communication channel media.

In an embodiment, the processing engine 202 may be embodied as a multi-core processor, a single core processor, or a combination of one or more multi-core processors and one or more single core processors. For example, the processing engine 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, or the like. In an embodiment, the processing engine 202 may be configured to execute hard-coded functionality. In an embodiment, the processing engine 202 is embodied as an executor of software instructions, wherein the instructions may specifically configure the processing engine 202 to perform the algorithms and/or operations described herein when the instructions are executed.

The memory 204 may be embodied as one or more volatile memory devices, one or more non-volatile memory devices, and/or a combination of one or more volatile memory devices and non-volatile memory devices. For example, the memory 204 may be embodied as magnetic storage devices (such as hard disk drives, floppy disks, magnetic tapes, etc.), optical magnetic storage devices (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.).

In an embodiment, the knowledge base 206 (i.e. the database) may be implemented as a relational database, a centralized database, a distributed database, an object-oriented database, or a flat database. In some embodiments, the centralized circuit system 210 may include appropriate storage interfaces to facilitate communication between the processing engine 202 and the knowledge base 206. Some examples of the storage interface may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing the processing engine 202 with access to the information stored in the knowledge base 206. It is noted that the database and the content included within the database are both interchangeably referred to herein as the knowledge base 206. Accordingly, it is understood that descriptive text such as 'data imported from plurality of data stores configures the knowledge base' as used herein implies that the data imported from the data stores configures, at least in part, the content stored within the physical database hardware.

In at least one embodiment, the communication module 208 includes communication circuitry such as for example, a transceiver circuitry including antenna and other communication media interfaces to connect to wired and/or wireless networks (such as for example, the communication network 120 shown in FIG. 1). The communication circuitry may, in at least some example embodiments, enable transmission of data signals and/or reception of signals from remote network entities, such as electronic devices of enterprise users and public and private data stores storing data associated with the enterprise data universe.

It is noted that the system 150 as illustrated and hereinafter described is merely illustrative of an apparatus that could benefit from embodiments of the invention and, therefore, should not be taken to limit the scope of the invention. It is noted that the system 150 may include fewer or more components than those depicted in FIG. 2.

In at least one example embodiment, the system 150 embodied as a platform may be accessible over the communication network 120 using a Web browser application. More specifically, an enterprise user may launch a Web browser application installed in an electronic device associated with the user and thereafter access the system 150 using a uniform resource locator (URL) associated with the system 150. Alternatively, the system 150 may be configured to provide a thin client interface or an instance of an application capable of being downloaded on the electronic device of the enterprise user. The enterprise user may then launch the application to connect to the system 150 over the communication network 120 and access the system 150. In at least some example embodiments, the enterprise user may register with the platform on first-time access and thereafter use a login ID and password to access the system 150. The user registration and subsequent login may be performed using well-known techniques for user registration and access to software platforms and are not explained herein.

In at least some embodiments, after successful login of an enterprise user, the system 150 may be configured to provide an option to enable the enterprise user to provide input related to source of each data store from among the plurality of data stores related with the enterprise. In an embodiment, the user may provide user input related to source of each data store from among the plurality of data stores related with the enterprise. The term 'source of each data store' as used herein refers to a Web address identifying a location associated with the data store. For example, the enterprise user may exemplarily provide an input '/DEMO/AMAZON-S3/MY-DATA-STORE'. It is noted that the provisioning of the location of a cloud-based data store is mentioned herein for illustration purposes. In some embodiments, the enterprise user may provide source of public or private data stores storing structured and/or unstructured data. For example, the user may provide source of data stores, such as one or more relational databases, one or more file systems, one or more on-premise data storage systems and one or more cloud-based data storage systems. In at least some embodiments, the communication module 208 may be configured to receive the user input related to the source of one or more data stores provided by the enterprise user. The communication module 208 may be configured to establish connection with each data store using the user input related to the respective store. In some embodiments, the system 150 may be configured to connect to exposed application programming interfaces (APIs) of the respective data stores over secure (or encrypted) communication links to import data from each data store after establishing respective connection. In at least some embodiments, the data imported from the multiple data stores together configures a knowledge base, such as the knowledge base 206 shown in FIG. 2. In at least one example embodiment, the knowledge base 206 may be auto-constructed and updated by the system 150 by including relevant information from the enterprise data universe. The data imported from each data store may be processed by the processing engine 202. The processing of data by the processing engine 202 to facilitate user access to the data is explained next with reference to FIG. 3.

Figure 3:
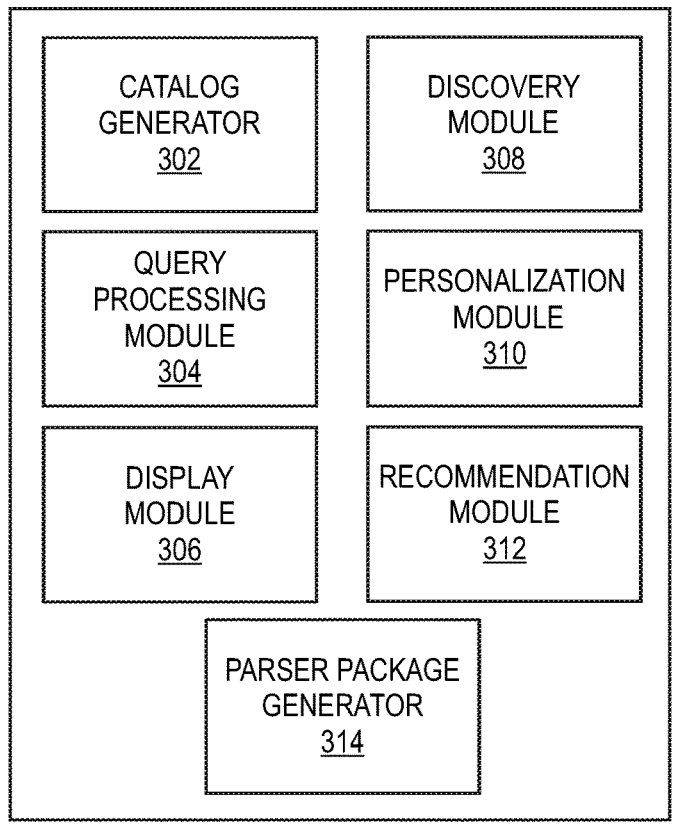
FIG. 3 shows a block diagram of the processing engine of the system of FIG. 2, in accordance with an example embodiment of the invention.

FIG. 3 shows a block diagram of the processing engine 202 of the system 150 of FIG. 2, in accordance with an example embodiment of the invention. The facilitation of user access to enterprise related data by the processing engine 202 is explained hereinafter with reference to various modules implementing functionalities of the processing engine 202 of the system 150. It is to be appreciated that the modules as described herein can be implemented using one processor or multiple processors described in FIG. 2.

The processing engine 202 is configured to include a catalog generator 302, a query processing module 304, a display module 306, a discovery module 308, a personalization module 310, a recommendation module 312 and a parser package generator 314. The catalog generator 302, the query processing module 304, the display module 306, the discovery module 308, the personalization module 310, the recommendation module 312 and the parser package generator 314 may be communicably coupled with each other and the other components of the system 150 of FIG. 2, such as the memory 204, the knowledge base 206 and the communication module 208, shown in FIG. 2. It is noted that, in some embodiments, the processing engine 202 may be substituted by a combination of individual modules, such that the combination of individual modules performs similar functions as that by the processing engine 202. In such a scenario, the information retrieval system 150 of FIG. 2 may be configured using the memory 204, the knowledge base 206, the communication module 208, the catalog generator 302, the query processing module 304, the display module 306, the discovery module 308, the personalization module 310, the recommendation module 312 and the parser package generator 314.

In an embodiment, the catalog generator 302 is configured to generate a catalog of data and metadata from the enterprise related data imported from the plurality of enterprise data stores. In an embodiment, the data imported in JavaScript Object Notation (JSON) format is automatically parsed by the catalog generator 302 to create datasets comprising rows and columns. It is noted that the enterprise user may add/delete rows or columns, edit attribute names or in general customize the dataset based on his/her respective requirement. Word indexes are then created from the datasets, and the datasets along with the respective word indexes together configure the catalog of data. The catalog generator 302 is configured to similarly generate a catalog of metadata.

In an example scenario, the enterprise user may want to view a dataset corresponding to 'clickstream' data. A dataset may be created from the clickstream data imported from a Web server (i.e. a data store). The dataset may include several columns and rows. In at least some embodiments, the attributes derived from the imported data may configure the column headings. Additional information such as the minimum and maximum values in a column (or in a dataset), the top recurring values, and the like, may be stored as metadata corresponding to such a dataset. In such a case, the catalog of data may correspond to the dataset created from the imported clickstream data along with associated information (such as word index, etc.), and the catalog of metadata may correspond to metadata stored corresponding to such a dataset. The catalog of data and metadata enable the user to query the knowledge base 206 in a convenient and hassle-free manner and retrieve answers to their queries. More specifically, user's request for information (i.e. the user's natural language query) serves as the query to the catalog of data and metadata to retrieve the desired information for the user from the knowledge base 206.

In an embodiment, the query processing module 304 is configured to facilitate a processing of the query received from the user. To that effect, the query processing module 304 is configured to generate a knowledge graph corresponding to each dataset. In at least some embodiments, the knowledge graph is a node-based structure including a plurality of nodes. One or more nodes from among the plurality of nodes are connected to one or more remaining nodes using respective edges. Further, in at least some embodiments, each node in the knowledge graph corresponds to an attribute in the dataset and each edge is configured to lead to a characteristic related to the respective attribute. The node-based structure of the knowledge graph and the traversal of the knowledge graph for determining response to queries of an enterprise user are explained with reference to FIG. 5.

In an embodiment, the display module 306 is configured to cause display of a user interface (UI) on an electronic device associated with a user. The UI serves as the single integrated interface to request information from the knowledge base 206. The user is saved the effort of learning features of individual UIs of the data stores to interact and retrieve data therefrom. Further, the catalog of data and metadata enables the user to query the knowledge base 206 using natural language and in a conversational manner, thereby precluding the hassle to learn a programming language or seek help from an IT personnel to retrieve information from a data store.

In an embodiment, the UI is configured to provide a plurality of query options to query the catalog of data and metadata (i.e. to request information from the knowledge base). In one embodiment, the UI is configured to provide an option to enable the user to provide a natural language typed input corresponding to the query, an option to provision the query in conversational speech form, an option to provision the query to a virtual assistant and an option to provision a click-based request for information. In addition to provisioning multiple query options to access data, the UI may also be associated with a plurality of response options to provide response to the user's queries. For example, the UI may be associated with an option to provide a specific answer as response to the query, an option to provide a virtual assistant response, an option to provide personalization based on user preferences, and an option to provide a recommendation to the user. As the UI provides multiple query and multiple response options for information retrieval, enterprise related data may be accessed in a convenient and hassle-free manner and in a format desired by the user. An example structure of the UI provisioning multiple query options to the user is shown in FIG. 4.

Figure 4:
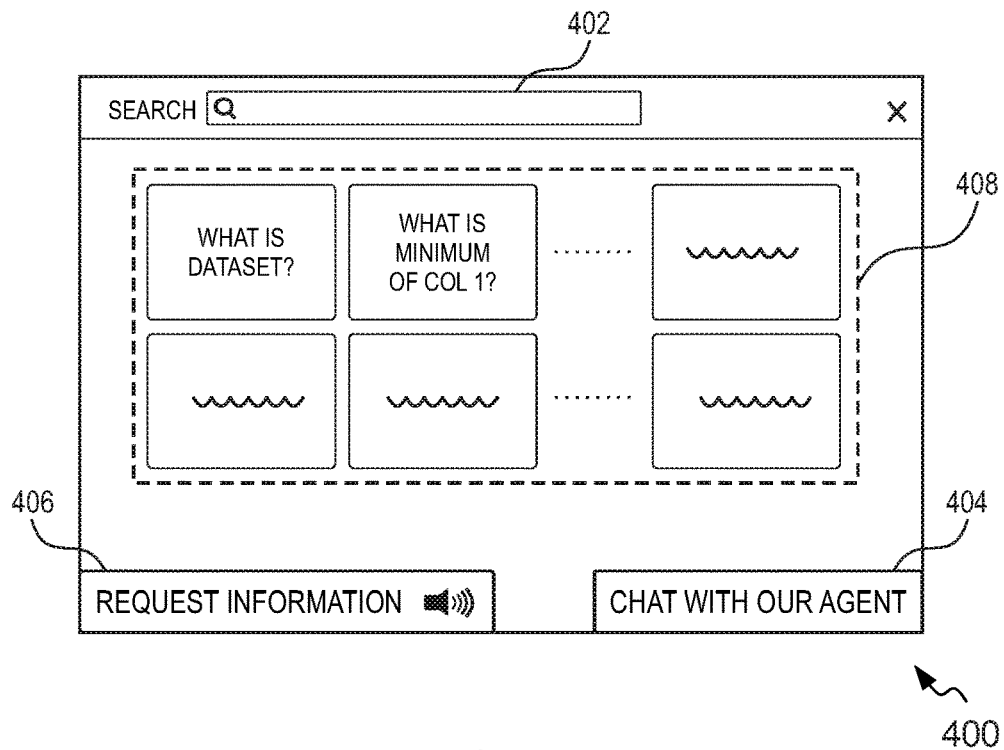
FIG. 4 shows a simplified representation of a UI presented to a user for facilitating user access to enterprise related data, in accordance with an example embodiment of the invention.

Referring now to FIG. 4, a simplified representation of a UI 400 presented to a user for facilitating user access to enterprise related data is shown, in accordance with an example embodiment of the invention. The UI 400 may be embodied as a mobile application UI, a browser UI or any such thin client interface application UI. It is noted that the simplified representation of the UI 400 is shown herein for illustrative purposes and that the UI 400 may include several tabs, menu options and other UI features, which are not shown herein.

As explained with reference to FIGS. 2 and 3, the display module 306 is configured to cause display of a UI, such as the UI 400, on the display screen of the electronic device associated with the user. The UI 400 may be displayed after the user has successfully logged into the online platform (i.e. the system 150). The UI 400 is configured to provide a single integrated interface for accessing enterprise related data stored in the knowledge base 206. The user may provide one or more queries using the UI 400 and the system 150 may be configured to process the queries and provide appropriate responses for the queries to the user using the UI 400.

As shown, the UI 400 is depicted to provide a plurality of query options to the user to enable the user to provision a query to the system 150. For example, the UI 400 depicts a query option 402 embodied as a form field. The user may type-in a natural language query in the form field to request information from the catalog of data and metadata. In at least some embodiments, the processing engine 202 of the system 150 (shown in FIG. 2) may be configured to facilitate auto-completion of the query being input by the user on the UI 400. The query processing module 304, in conjunction with the recommendation module 312, may use machine learning algorithms stored in the memory 204 to learn user behavior and suggest options to complete the query while the user is providing the natural language query input in the form field (shown as query option 402 in FIG. 4). Furthermore, in at least some embodiments, the processing engine 202 may also facilitate sub-word based searching for information stored in the catalog. For example, the catalog may save a column name as "Orders CSV file". Each sub word of aforementioned column may be indexed in the catalog word index stored in the knowledge base 206. Hence the user may search for a data in the catalog using the index. For example, the user may begin typing "Or" or "Ord", and a result may include only the "Orders CSV file", if the only word beginning with "Or" in the catalog word index is "Orders CSV file". As a result, a search for words in the enterprise catalog is made efficient by including aforesaid sub-word search feature.

The UI 400 also displays a query option 404, a query option 406 and a query option 408. The query option 404 is embodied as a widget and is configured to enable the user to provision the query to a virtual assistant (for example, a chatbot). In an embodiment, user selection of the query option 404 may cause display of a chat window to enable a chat interaction with the virtual assistant. The virtual assistant (or the chatbot) may interact with the user for obtaining information descriptors related to the information to be retrieved. The information descriptors obtained may be converted into an assistant based request for information. In some embodiments, the virtual assistant is configured to interpret the query using natural language processing and special grammar and respond appropriately to the user's query.

The query option 406 is embodied as a button and is configured to enable the user to request information (i.e. provide a query) in conversational speech form. More specifically, the user may select the button to activate a microphone associated with the user's electronic device. The user may then provide a speech input such as 'what is a dataset?' to provide the query input. The speech input may be transformed into text using natural language based speech-to-text processing. In one embodiment, the text (i.e. converted speech) may be displayed in the form field corresponding to the query option 402 subsequent to provisioning of the speech input by the user. In one embodiment, the text (i.e. converted speech) may be provided as an input to the virtual assistant to initiate a chat interaction with the virtual agent.

The query option 408 provides several tabs, which the user can provide a click input on, to provision the query. Each tab displays a standard query that might be of interest to the user. The standard queries shown on the tabs may be identified by learning user's past behavior or by learning from other users, who are similar to the current user (i.e. have similar persona, similar work profile, etc.).

Accordingly, as can be seen from FIG. 4, the user is provided with several options to provision queries to the catalog of data and metadata and seek answers. It is noted that in addition to the plurality of query options, the UI 400 is also associated with a plurality of response options. For example, the UI 400 may be associated with an option to provide a specific answer as response to the query, an option to provide a virtual assistant response, an option to provide personalization based on user preferences, and an option to provide a recommendation to the user. In an illustrative example, a user may provision a query 'What is the minimum of column 1 in the dataset'. Such a query may be processed by the query processing module 304 as will be explained in detail later, and a response provided to the user. The response may be a specific answer such as for example a value '12345'. In another example scenario, the response may be a virtual assistant response such as for example 'Would you also like to consider clickstream data?'. In yet another scenario, the response may be personalized. For example, the response may be provisioned in form of a graphical representation along with associated data. In yet another example scenario, one or more recommendations may be provided to the user as a response to the user's query.

In at least one example embodiment, the processing engine 202 may be configured to select a response from among the plurality of response options. In an example scenario, if the user has provisioned a natural language typed query and a specific answer exists for the query, then the processing engine 202 may be configured to provide the specific answer as response to the query. Similarly, if the query is addressed to the virtual assistant, then the response may be provided as a virtual assistant response. If sufficient learning data is available and if the response can be personalized or suitable recommendations can be provided to the user, then the processing engine 202 may choose to personalize the response or provide one or more recommendations to the user. The UI 400 thus enables the users to retrieve answers to their queries in the form they desire, thereby precluding the need to involve IT personnel to customize the responses retrieved from the data stores. The processing of the queries is explained hereinafter.

Referring now to FIG. 3, as explained, the query processing module 304 is configured to facilitate processing of the query input provisioned by the user using a UI, such as UI 400. The communication module 208 of the system 150 is configured to receive the query provided by the user on the UI using one of the query options, such as query options 402-408 on the UI 400 shown in FIG. 4. The communication module 208 is further configured to provision the query to the processing engine 202. The query processing module 304 of the processing engine 202 may be configured to receive the query and initiate processing of the query.

In an embodiment, the query processing module 304 may first pre-process the query to identify a plurality of words (for example, bi-grams and tri-grams) that belong together or need to be looked at as a single word. The identification of words may be based on the catalog of metadata stored in knowledge base 206. For example, 'Customer_Key' may be treated as a single word based on metadata stored in the knowledge base 206. The pre-processed query may then be parsed to generate a plurality of query elements. For example, for a query such as "What is the maximum of a column?", the query processing module 304 may parse the query into query elements, i.e. separate words, such as "what", "is", "the", "maximum", "of", "a", "column".

The query processing module 304 is further configured to perform a grammar-based analysis of the plurality of query elements. In one embodiment, the query processing module 304 includes a grammar parser for performing the grammar-based analysis of the plurality of query elements. In an embodiment, the grammar parser is a combinatory categorical grammar based parser. The combinatory categorical grammar based parser may be configured to classify the parsed words as one of an 'action', 'intent' or 'noun'. For example, for a set of parsed words such as: "what", "is", "the", "maximum", "of", "a", "column", the combinatory categorical grammar based parser may classify "what" as the action as it defines a question. Further, "maximum" may be classified as intent, and "column" may be classified as the noun, and may be made as part of the metadata while querying the knowledge base 206.

In at least some example embodiments, the query processing module 304 further includes a 'trained probabilities of language with parts of speech' module, which is a pre-trained English language processor that includes metadata nouns and transitions. The combinatory categorical grammar based parser may refer to the metadata nouns and transitions stored within the trained probabilities of language with parts of speech module for purpose of classifying the parsed words as one of the action, intent or noun.

In an example embodiment, based on the classified parsed words, the query processing module 304 may be configured to invoke a help parser package provisioned by the parser package generator 314. The parser package generator 314 may be configured to provision one or more parser packages for facilitating processing of user queries. It is noted that the parser packages facilitate accessing different parts of the data/metadata. The parser package generator 314 is configured to use machine learning algorithms specific to natural language processing to learn sentences, conversations and questions that the user is asking the system 150. In some embodiments, the parser packages may also facilitate auto complete features while typing and also provide ability for favorites. Some non-exhaustive example of parser packages may include a statistics package configured to address all user access of statistics using a conversational form (such as for example, queries like 'what is the minimum of total_price?', etc.), a financial statement package configured to address all user access to answering questions about financial statements using a conversational form (such as for example, queries like 'What was the revenue for 2014?', etc.), a help package configured to address all user access of help fields associated with the system 150 using a conversational form (such as for example, queries like 'What is a dataset?', etc.), and the like.

In case the classified parsed words of a query, lack a noun, and the intent is a defined keyword in the help parser package, a definition and help stored against the defined keyword in the help parser package may be provided to the user as an answer to the query. An example query that may result in invoking the help parser package is: "What is a dataset?" In this example, the parsed words may be "What", "is", "a", and "dataset". Out of the parsed words, the query processing module 304 using the combinatory categorical grammar based parser may classify "What" as the action, and the "dataset" being a defined keyword as the intent. As the parsed words lack a noun, and the Intent "dataset" is the defined keyword in the help parser package, the combinatory categorical grammar based parser may invoke the help parser package. Further, the definition provided in the help parser package for the defined keyword "dataset" may be provided to the user as an answer to the query "What is a dataset?". Other examples of queries that may result in invoking the help parser package include, "What is a Job?", "What is a workflow?", "What are derived attributes?" and the like. Aforesaid queries usually lack presence of the Noun. Presence of the Noun in the classified parsed words may result in computing of the expression as will be described below.

Further, the query processing module 304 is configured to generate an expression based on the grammar-based analysis of the plurality of query elements. The query processing module 304 may use a parser package to provide an association between the classified action, intent and noun, and convert the classified action, intent and noun into an expression. In an illustrative example, the expression may have a following format Action(Intent(noun)). For example, for classified words such as "what" as the action, "maximum" as the intent and "column" as the noun, the expression may be computed as "What(maximum(column))".

In an embodiment, the discovery module 308 is communicably coupled with the query processing module 304 and is configured to use the expression to retrieve at least one answer to the query from the knowledge base 206. In an embodiment, the discovery module 308 may be configured to evaluate the expression in an inside out manner. For evaluating the expression, the discovery module 308 may be configured to select a node from among the plurality of nodes in the knowledge graph based on the expression. The discovery module 308 may further be configured to traverse the knowledge graph along at least one edge associated with the selected node based on the expression to select a subsequent node in the knowledge graph. In an embodiment, the selected subsequent node in the knowledge graph corresponds to an answer to the query of the user. The traversal of the node is explained in further detail below:

In an embodiment, for evaluating the expression, a node corresponding to the noun of the expression may be looked up in the knowledge graph stored in the knowledge base 206. Further, an edge associated with the node that may correspond to the intent of the expression may be found in the knowledge base 206. Furthermore, a second node to which the edge points to in the knowledge base 206 may be determined. A noun corresponding to the second node may be provided as an answer to the query represented by the expression. A demonstrative knowledge graph stored in the knowledge base 206 used for evaluating the expression is explained with reference to FIG. 5.

Figure 5:
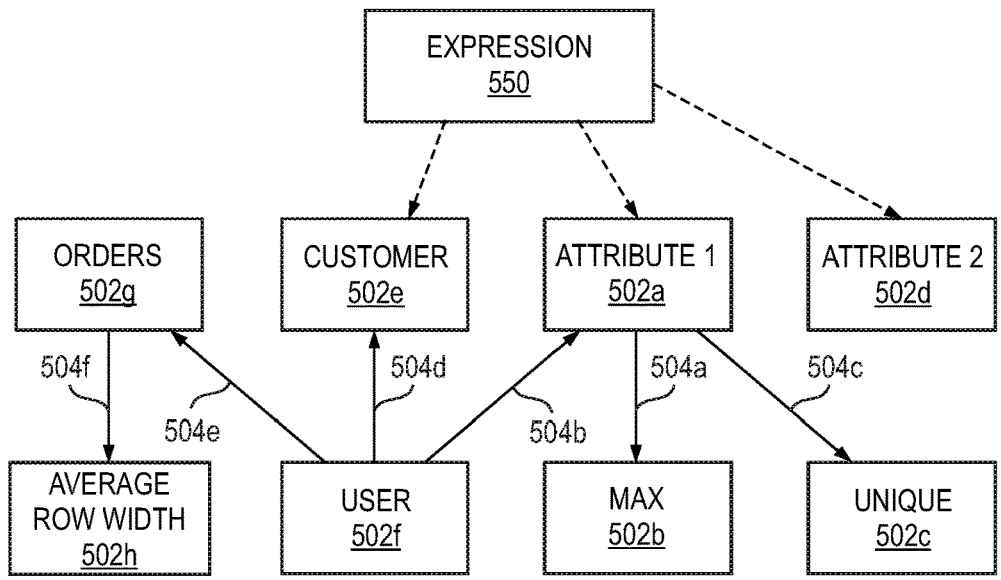
FIG. 5 shows a representation for illustrating a knowledge graph capable of facilitating information retrieval from the knowledge base, in accordance with an example embodiment of the invention.

FIG. 5 shows a representation for illustrating a knowledge graph 500 capable of facilitating information retrieval from the knowledge base 206, in accordance with an example embodiment of the invention. The knowledge graph 500 depicts plurality of nodes 502a-h connected via a plurality of edges 504a-f. Further, a node may be connected to another node via one or more edges such that, the nodes depict nouns (or attributes in the dataset such as column headings for instance) and the edges represent associated properties with the connected nouns, or more specifically each edge is configured to lead to a characteristic related to the respective noun/attribute. For example, a node such as node 502f depicting noun "user" may be connected with another node such as node 502g depicting a noun "orders" (i.e. a characteristic related to the noun 'user') via an edge 504e such that the edge 504e may correspond to an intent or associated properties between the "user" and the "orders" associated with the "user".

Further, for evaluating the expression 550 of the form Action(Intent(Noun)) from the knowledge graph 500, the discovery module 308 may initially select a node in the knowledge graph 500 that corresponds to the noun of the expression 550. The discovery module 308, may further, determine an edge associated with the node that corresponds to the intent of the expression 550. Further, the discovery module 308 may determine a second node to which the edge points to and may provide a second noun associated with the second node as an answer to the query represented by the expression 550. In an example embodiment, an expression 550 may take the form Action(Intent(Attribute 1)), in which case, the discovery module 308 may locate a node that corresponds to attribute of name "Attribute 1". As shown in FIG. 5, Attribute 1 is located at node 502a. The discovery module 308 may further determine an edge that corresponds to the intent of said expression 550. In case the edge 504a corresponds to the intent, then the node 502b being the node to which the edge 504a points to may be determined as the second node. As the node 502b corresponds to an attribute "max", the attribute "max" may be provided as an answer to a query represented by the example expression 550.

Referring back to FIG. 3, in an embodiment, the discovery module 308 may be configured to provision the answer to the query processing module 304. The answer may further be provided to the personalization module 310 and the recommendation module 312 and an appropriate response to the query may be determined by the query processing module 304. The response may be selected from among a plurality of response options explained with reference to FIG. 4. The response may be provisioned to the communication module 208, which in conjunction with the display module 308 may be configured to cause display of a UI showing the response to the user. The provisioning of a personalized response by using the personalization module 310 is explained in further detail with reference to FIG. 6.

Figure 6:
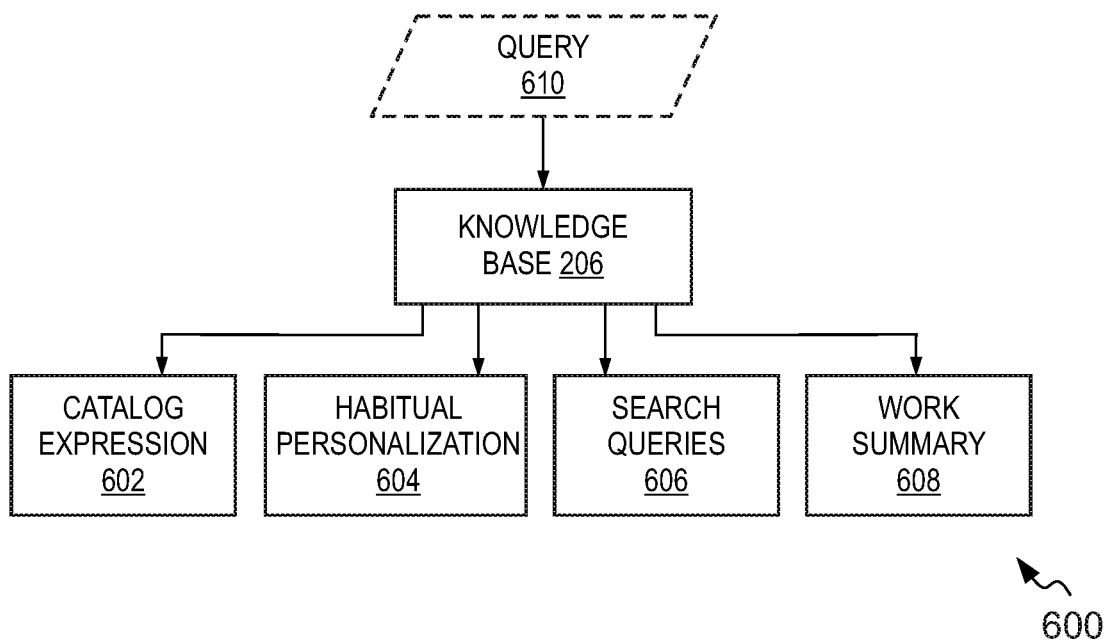
FIG. 6 shows a block diagram representation for illustrating provisioning of a personalized response to a user in response to the user's query, in accordance with an example embodiment of the invention.

FIG. 6 shows a block diagram representation 600 for illustrating provisioning of a personalized response to a user in response to the user's query 610, in accordance with an example embodiment of the invention. In an example scenario, a user may provision the query 610 in form of a click-based request for information. For example, the user may select a tab from among the several tabs associated with query option 408 shown in FIG. 4, to provision the query 610 in form of a click-based request. The query 610 may be received by the query processing module 304 and an expression corresponding to the query 610 may be generated by the query processing module 304 as explained with reference to FIG. 3. It is noted that query 610 may not be always provided by selection or clicking of a tab. In some embodiments, the query 610 may also be interpreted from user action. The expression may be evaluated in an inside-out manner by the discovery module 308 to determine an answer to the query 610.

Further, in at least one embodiment, the personalization module 310 (shown in FIG. 3) may access user preferences stored in the knowledge base 206, to determine whether a personalized response can be provided to the user. Some non-exhaustive types of personalization that may be provided to the user include a catalog expression 602, a habitual personalization 604, search queries 606 and work summary 608.

The catalog expression 602 type of response personalization implies provisioning preferred joins, filters, aggregates or derived attributes applicable to the user. The habitual personalization 604 type of response personalization implies displaying preferred naming schemes for functionalities accessed by the user. For example, if the user usually names a performed functionality with a prefix as "myJob_" followed by a name that reflects the performed functionality, then the personalization module 310 may auto-populate a name for a subsequent performed functionality named "abc" accessed by the user as "myJob_abc". Such naming schemes may indicate functionalities and usage of the system 150 by a particular user. The search queries 606 type of response personalization implies displaying suggestions on search query terms, sentences, questions, and catalog-word-searches frequently used by the user. The work summary 608 type of response personalization implies repeating a sequence of tasks based on learnt user behavior. For example, if the user creates two datasets and a transformation job in a week, and a request for a work summary during the week is received by the system 150, the personalized response may include creation of the two datasets created, and the transformation job.

The personalization module 310 may also be configured to catalog all tasks performed by the user, and store the catalogued tasks in the knowledge base 206 for future referencing. In another example embodiment, when the request is the click-based request, the response may be in the form of a recommendation provided by the recommendation module 312. The response provided in form of a recommendation is explained with reference to FIG. 7.

Figure 7:
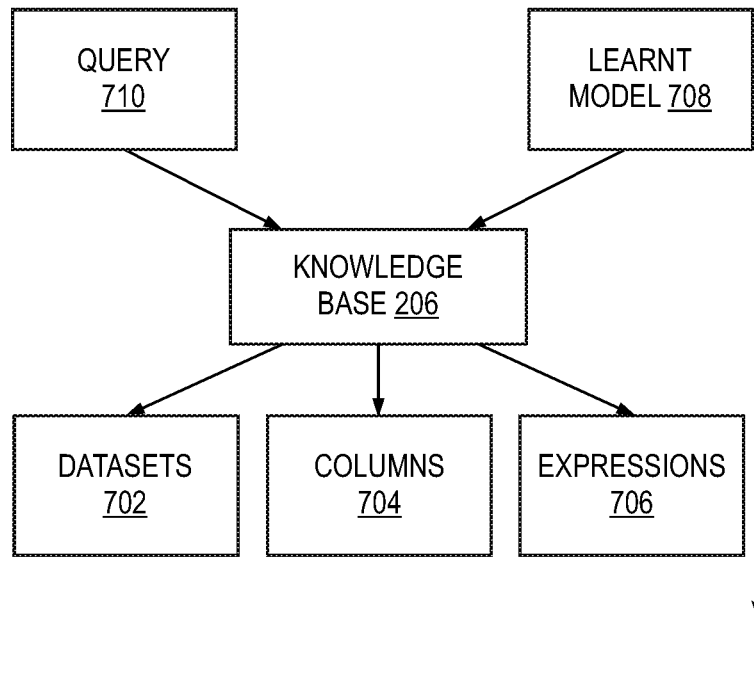
FIG. 7 shows a block diagram representation for illustrating a provisioning of a recommendation to a user in reply to the user's query, in accordance with an example embodiment of the invention.

Referring now to FIG. 7, a block diagram representation 700 for illustrating a provisioning of a recommendation to a user in reply to the user's query is shown, in accordance with an example embodiment 710 of the invention. When the query 710 is received by the system 150, the recommendation module 312 (shown in FIG. 3) may refer to the knowledge base 206, and a learnt model 708 (for example, a supervised or an unsupervised learnt model) to provide the recommendation response. The recommendation response may include additional information on datasets 702, columns 704, and expressions 706 associated with a current context of the query 710. In an example embodiment, the recommendation response may also include additional information on data stores and transformation jobs associated with the query 710. The recommendation response may usually include a plurality of layers such as a frequency distribution layer based on querying of a knowledge graph present in the knowledge base 206, recommendations from the learnt model 708, and a combination of the frequency distribution and the learnt model 708. For example, if the virtual assistant is asked a question associated with interaction with the user, the recommendations are ranked based on a frequency of the interaction of the user with the virtual assistant.

The learnt model 708 may include unsupervised models and supervised models. The unsupervised models are usually built by identifying features recognized on the enterprise catalog by using a neural network. The unsupervised models may be continuously built on the system 150. The unsupervised models may be used to infer the recommendation response to the user. For example, if the user asks a question as; "what is a minimum of a column 1?", the recommendation response inferred from the unsupervised model may be specific to column 1. Further, supervised models, may be built based on the specific answer responses provided to the one or more queries. For every valid question, the supervised model learns a probability of the question to an answer, and a path taken in the knowledge graph. As a result, when a new question is asked, or a recommendation is requested, using the learnt model 708 and the knowledge base 206, relevant information may be provided to the user, from which an answer to the new question may be inferred.

The virtual assistant based queries received on the UI, such as the UI 400, may typically include two components. One component may include a natural language processing (NLP) layer where the request includes a specific question about data present in the knowledge base 206. For example, the request may be of a form: "What is the minimum of a column?", and "What is a dataset?". In such a case, the response may include pre-saved or computed answers from the knowledge base 206. The response need not be associated with a current session between the user and the virtual assistant. For example, for the request: "What is the minimum of a column?", the response may be a number, i.e. a minimum of the column in question retrieved from the knowledge base 206.

Another component may include a memory concept associated with the request. For example, the user may type a sentence such as "Can you join dataset 1 with dataset 2?". As the sentence includes "joining", which is an action performed on two datasets such as the dataset 1 and the dataset 2, a conceptual relationship between the dataset 1 and the dataset 2 may be stored in the knowledge base 206. As a result, when the user asks a subsequent question such as: "What is a relationship between dataset 1 and dataset 2?", the aforesaid conceptual relationship may be provided as a response.

Typically, the virtual assistant may perform a task, memorize the task and associate the task to one or more data entities comprising the task. Hence, when a subsequent request concerning the one or more data entities is received, the virtual assistant may provide a response including the associated memory concept herein the performed task.

The provisioning of a natural language query by the user and the provisioning of a response to the user is explained with reference to an illustrative example in FIG. 8.

FIG. 8 shows a representation of a UI 800 for illustrating provisioning of a response to a user query input, in accordance with an example embodiment of the invention. As explained with reference to FIG. 4, the display module 308 (shown in FIG. 3) of the system 150 is configured to cause display of UI, such as the UI 400, configured to enable the user to query a catalog of data and metadata generated from the enterprise related data stored in a plurality of data stores. The UI 400 provides several query options to the user to provision the query. The UI 800 shown in FIG. 8 is similar to the UI 400. The UI 800 displays a form field 802 capable of receiving a natural language query input from the user. As an illustrative example, the user is depicted to have provided a natural language query 804 including text 'What is the min of Col 1'. It is noted that the option to provision the query using speech input, the option to provision the query to a virtual assistant or the option to provide a click-based request for information are not shown herein for illustration purposes.

The UI 800 is further depicted to display a response section 806 and a popular keywords section 808. The popular keywords section 808 is depicted to include suggestions for completing the ongoing text input. For example, the popular keywords section 808 is depicted to include keyword suggestions like 'Col 11', 'Col 123', 'dataset', 'Job 10' and 'Job 11' for completing the natural language query 804. The user may use the term 'Job' for saving edited columns or edited datasets. Hence, the personalization module 310 may provision such suggestions for completing the search query.

The response section 806 shows a plurality of possible responses to the natural language query 806. More specifically, the response section 806 is depicted to show responses such as response 810, 812, 814, 816, 818 and 820. The response 810 is depicted to include a value '12345' as a response to natural language query 806 (i.e. minimum of Col 1), whereas the responses 812-820 are depicted to display values which are responses to possible variations of the search query.

The recommendation module 312 is configured to provide recommendations such as those displayed in section 822. More specifically, the recommendation section is depicted to display additional information such as a listing of all datasets in the catalog which include the term 'Col 1'. Further, the recommendation section 822 also display additional information such as responses to queries from other users, who are similar to the user and who have also asked the natural language query 804.

As can be seen, the system 150 is configured to take user's preferences into account and personalize the response. Moreover, recommendations shown to the user improve a quality of user experience and provides all relevant information to the user in a single UI. The provisioning of the natural language query to a virtual assistant by the user and the provisioning of a response to the user is explained next with reference to illustrative example in FIG. 9.

Figure 9:
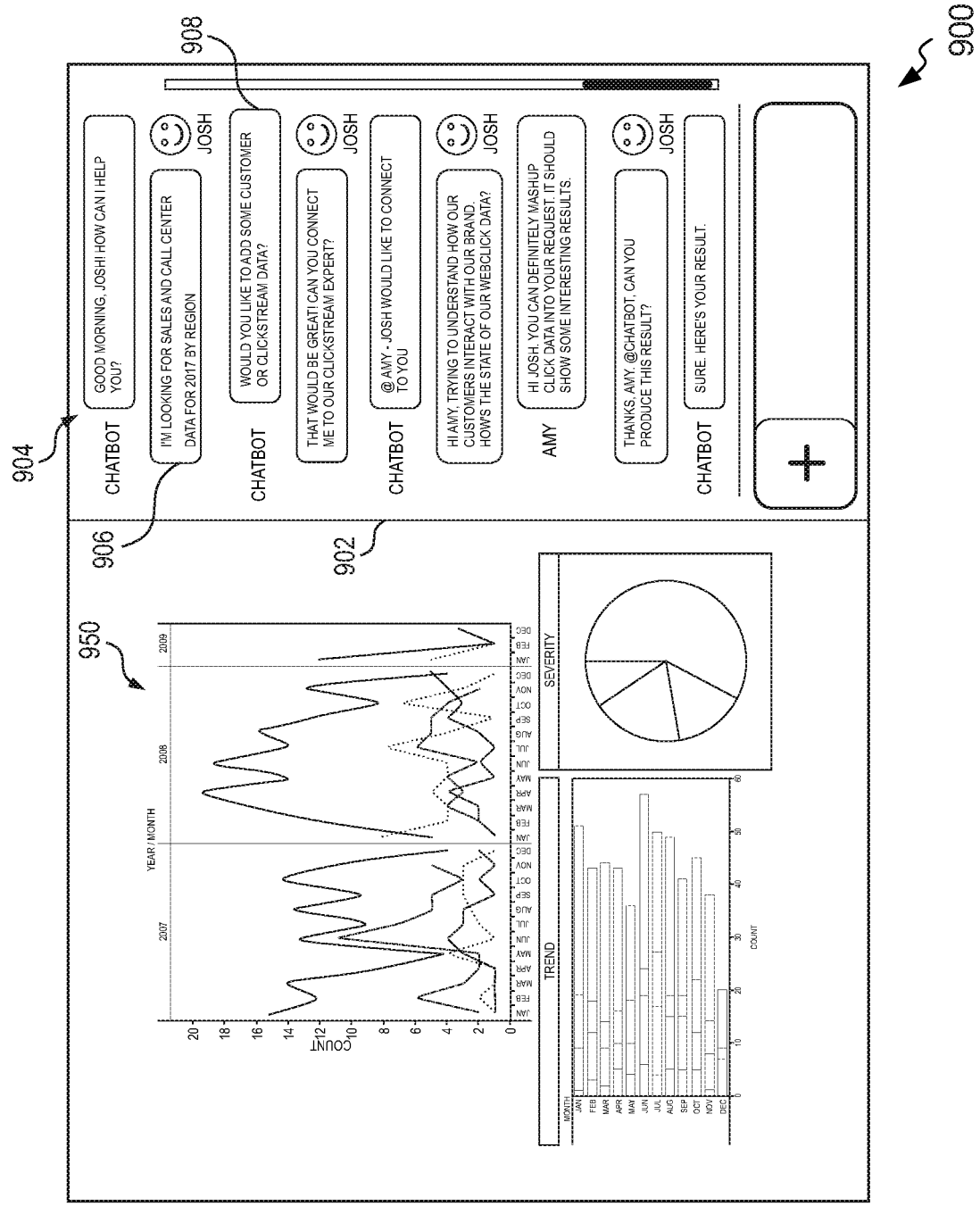
FIG. 9 shows a representation of a UI for illustrating provisioning of a response to a user query input, in accordance with another example embodiment of the invention.

FIG. 9 shows a representation of a UI 900 for illustrating provisioning of a response to a user query input, in accordance with another example embodiment of the invention. The UI 900 shown in FIG. 9 is similar to the UI 400 shown in FIG. 4. More specifically, the UI 900 provides several query options to the user to query a catalog of data and metadata generated from enterprise related data imported from a plurality of data stores. One such query option is to provision the query to a virtual assistant. As explained with reference to FIG. 4, a widget may be displayed to the user on the UI 400. On selection of the widget, a chat window, such as the chat window 902 is displayed on a portion of the UI 900 to enable the user to engage in a chat conversation, such as the chat conversation 904, with a virtual assistant. In the chat conversation 904, the virtual agent chat lines are exemplarily depicted to be labeled with term 'Chatbot' and the user chat lines are exemplarily depicted to be labeled with the name 'Josh'.

In the chat conversation 904, the user 'Josh' is shown to have asked a natural language query 906 including text 'I'm looking for sales and call center data for 2017 by region'. As explained with reference to FIGS. 2 and 3, the system 150 is configured to receive the natural language query 906 (for example, by using the communication module 208) and process the query using the query processing module 304 to determine an appropriate response for the natural language query 906. Further as explained earlier, the response may be selected from among a plurality of response options. For example, the response may be a virtual assistant response or a recommendation. In FIG. 9, the Chatbot is depicted to provide a virtual assistant response 908, which is also a recommendation. More specifically, the response 908 'Would you like to add some Customer or Clickstream Data?' is depicted to be provided in reply to the natural language query 906. Such a response includes a recommendation to add or merge other datasets to the dataset requested by the user 'Josh'. As explained with reference to FIG. 7, the recommendation may be provided by the recommendation module 312 using learnt models, such as learnt models 708. The chat conversation 904 further depicts the Chatbot connecting the user 'Josh' to a human agent 'Amy' to enable the user to request addition of the customer and clickstream data. An example presentation of the results is shown as a graphical representation 950 in FIG. 9.

The UI 900 illustrates an example usage of one of the query options, i.e. an option to provide query to a virtual assistant. Further, the response is provisioned as a recommendation. Such provisioning of a response precludes the user from sifting through multiple responses from a datastore and merging the information with datasets from other data stores. A method for facilitating user access to enterprise related data is explained next with reference to FIG. 10.

Figure 10:
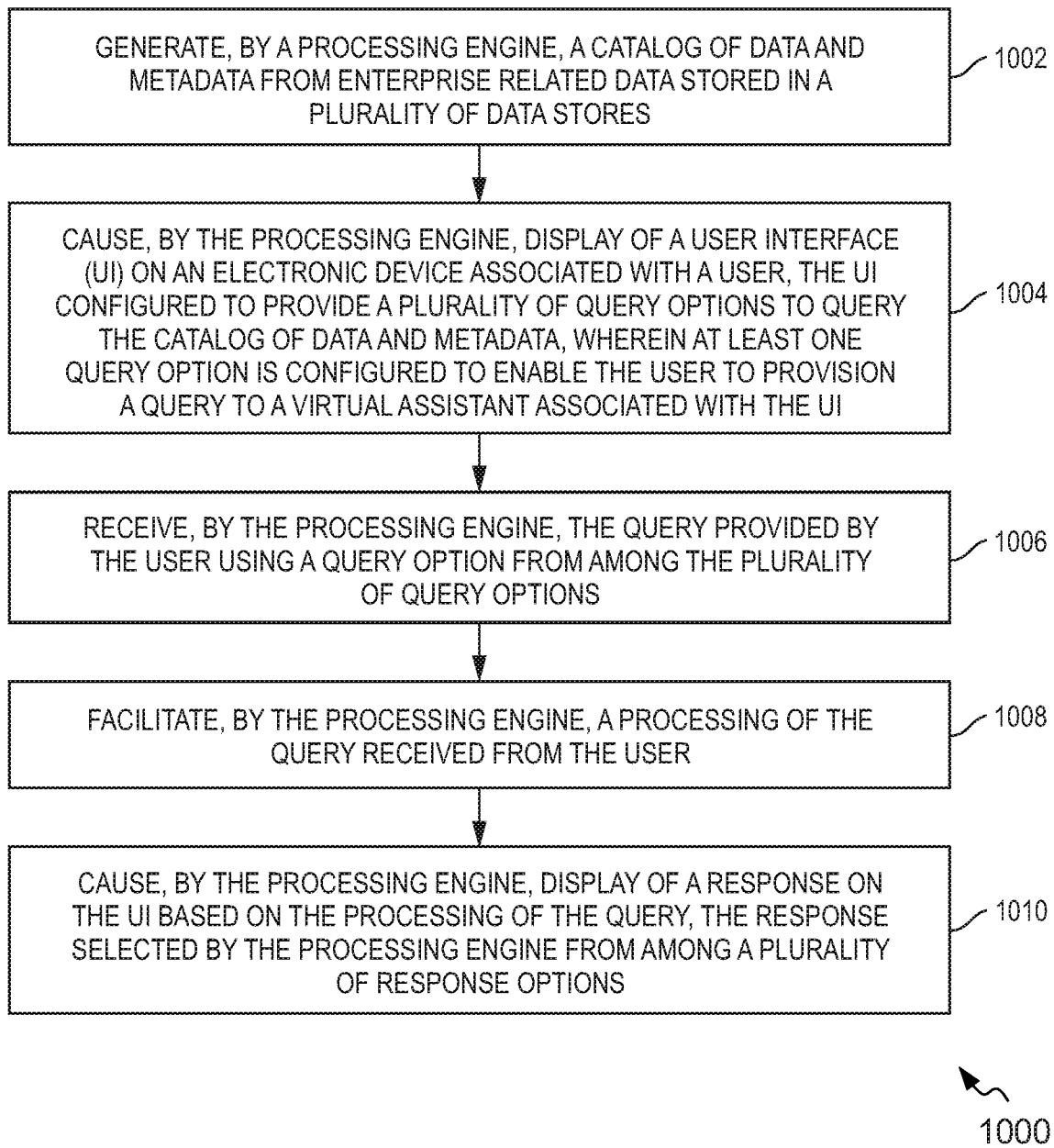
FIG. 10 is a flow diagram of a method for facilitating user access to enterprise related data, in accordance with an example embodiment of the invention.

FIG. 10 is a flow diagram of a method 1000 for facilitating user access to enterprise related data, in accordance with an example embodiment of the invention. The various steps and/or operations of the flow diagram, and combinations of steps/operations in the flow diagram, may be implemented by, for example, hardware, firmware, a processor, circuitry and/or by the processing engine 202 of the system 150 of FIG. 2 and/or by a different electronic device associated with the execution of software that includes one or more computer program instructions. The method 1000 starts at operation 1002.

At operation 1002, a catalog of data and metadata from enterprise related data stored in a plurality of data stores is generated by a processing engine, such as the processing engine 202 of the system 150. As explained with reference to FIGS. 2 and 3, enterprise related data may be imported from each data store specified by the user. The processing engine 202 may then generate one or more catalogues of data and metadata from the imported data. Each catalog may include one or more datasets. Each dataset may include a matrix of rows of columns. Various attributes of each dataset, such as column headings, size of dataset, maximum/minimum/average values in each column, etc. may configure the metadata for each dataset. The generation of the catalog of data and metadata by the processing engine may be performed as explained with reference to the generation of the catalog of data and metadata by the catalog generator 302.

At operation 1004, display of a user interface (UI) is caused on an electronic device associated with a user by the processing engine. In one embodiment, a UI, such as the UI 400 or the UI 800, may be displayed to the user by the processing engine. The UI is configured to provide a plurality of query options to query the catalog of data and metadata. At least one query option from among the plurality of options is configured to enable the user to provision a query to a virtual assistant associated with the UI as shown in FIG. 9. In one embodiment, the UI is configured to provide an option to enable the user to provide a natural language typed input corresponding to the query, an option to provision the query in conversational speech form, an option to provision the query to a virtual assistant and an option to provision a click-based request for information. The provisioning of the multiple query options is explained with reference to FIG. 4 and is not explained again herein.

At operation 1006, the query provided by the user using a query option from among the plurality of query options is received by the processing engine. The provisioning of natural language queries may be performed as explained with reference to FIGS. 8 and 9, and is not explained again herein. More specifically, FIG. 8 shows an example provisioning of a natural language query as a typed input, whereas FIG. 9 shows an example provisioning of the query to a virtual assistant.

At operation 1008, a processing of the query received from the user is facilitated by the processing engine. The processing of the query may involve pre-processing of the query, parsing of the query to generate query elements, performing grammar-based analysis of the query elements, generating the expression and identifying an appropriate answer to the query by traversing a knowledge graph (of the corresponding dataset) using the expression. The processing of the query may be performed by the processing engine as explained with reference to the processing of the query by the query processing module 304 and the discovery module 308 in FIGS. 3 and 5.

At operation 1010, display of a response on the UI is caused based on the processing of the query by the processing engine. The response is selected by the processing engine from among a plurality of response options. As explained with reference to FIG. 2, in addition to provisioning multiple query options to access data, the UI may also be associated with a plurality of response options to provide response to the user's queries. For example, the UI may be associated with an option to provide a specific answer as response to the query, an option to provide a virtual assistant response, an option to provide personalization based on user preferences, and an option to provide a recommendation to the user. As the UI provides multiple query and multiple response means to the user to retrieve information, enterprise related data may be accessed in a convenient and hassle-free manner and in a format desired by the user. The provisioning of the response may be performed by the processing engine as explained with reference to FIGS. 8 and 9 and is not explained again herein. In at least some embodiments, the response provided to the user is personalized by taking into account user's preferences. In another embodiment, one or more recommendations are provided to the user as response. The provisioning of the personalization of response and recommendations may be performed as explained with reference to FIGS. 6 to 9.

Figure 11:
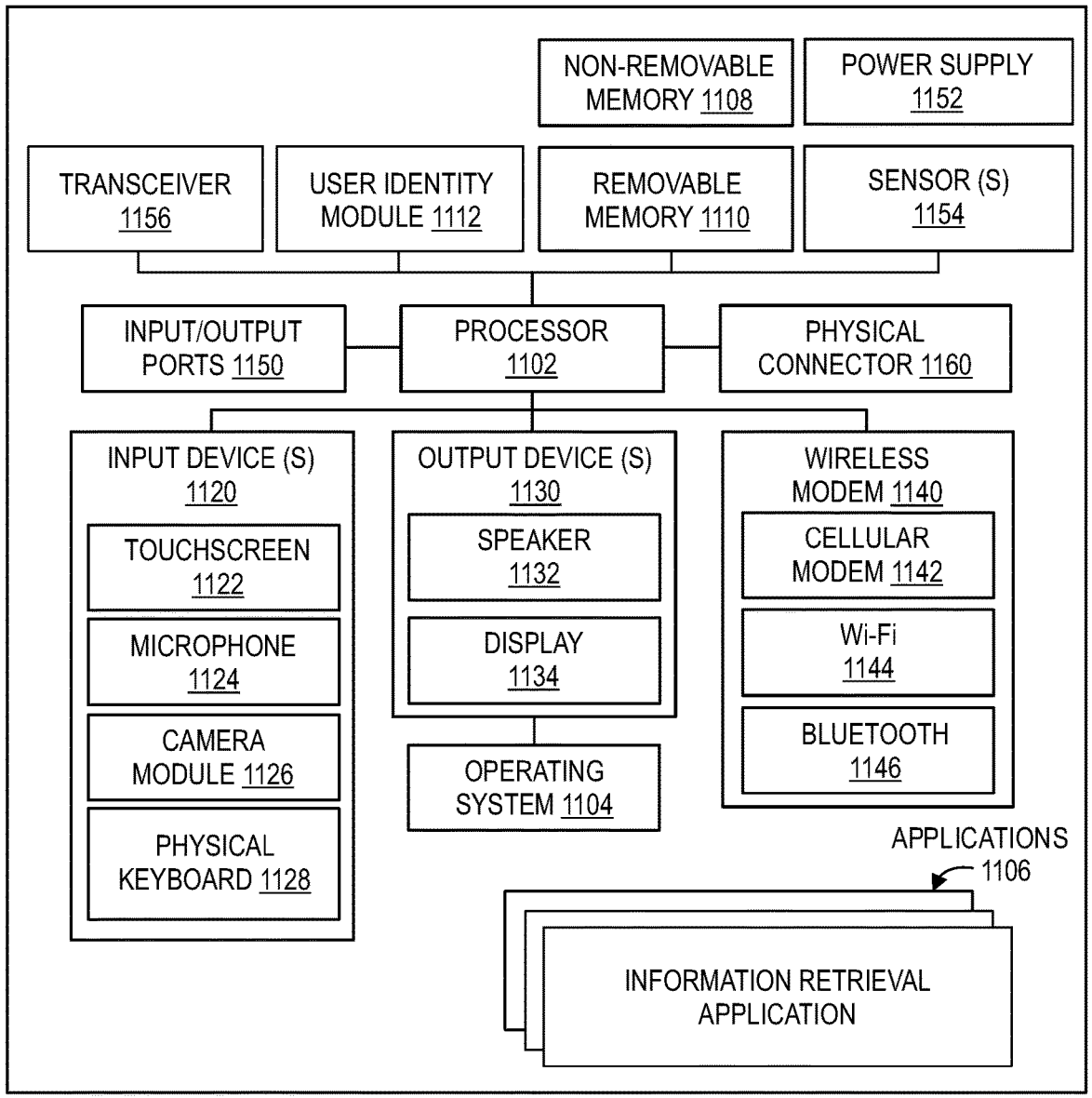
FIG. 11 shows an electronic device capable of implementing the various embodiments of the present invention.

FIG. 11 shows an electronic device 1100 capable of implementing the various embodiments of the present invention. In an embodiment, the various operations performed by the system 150 may be implemented using an application in an electronic device, such as the electronic device 1100. For example, the electronic device 1100 may correspond to an electronic device associated with an enterprise user, such as for example an information technology (IT) professional, a data scientist, a business analyst such as for example a retention analyst, a risk analyst or a marketing executive, or any such individual within the enterprise tasked with analyzing enterprise data for performing a variety of tasks, such as identifying trends, obtaining actionable insights, checking key metrics, and the like. The electronic device 1100 is depicted to include one or more applications 1106, including an information retrieval application, which serves as an instance of the application downloaded from the system 150 and capable of communicating through API calls with the system 150 to facilitate retrieval of information from a plurality of data stores associated with the enterprise data universe.

It should be understood that the electronic device 1100 as illustrated and hereinafter described is merely illustrative of one type of device and should not be taken to limit the scope of the embodiments. As such, it should be appreciated that at least some of the components described below in connection with that the electronic device 1100 may be optional and thus in an example embodiment may include more, less or different components than those described in connection with the example embodiment of the FIG. 11. As such, among other examples, that the electronic device 1100 could be any of a mobile electronic devices, for example, cellular phones, tablet computers, laptops, mobile computers, personal digital assistants (PDAs), mobile televisions, mobile digital assistants, or any combination of the aforementioned, and other types of communication or multimedia devices.

The illustrated electronic device 1100 includes a controller or a processor 1102 (e.g., a signal processor, microprocessor, ASIC, or other control and processing logic circuitry) for performing such tasks as signal coding, data processing, image processing, input/output processing, power control, and/or other functions. An operating system 1104 controls the allocation and usage of the components of the electronic device 1100 and support for one or more applications programs (see, applications 1106), such as information retrieval application, that implements one or more of the innovative features described herein. In addition to information retrieval application, the applications 1106 may include common mobile computing applications (e.g., telephony applications, email applications, calendars, contact managers, web browsers, messaging applications) or any other computing application. The information retrieval application, in at least one example embodiment, may be configured to facilitate user access to enterprise related data, as explained with reference to FIGS. 1 to 10.

The illustrated electronic device 1100 includes one or more memory components, for example, a non-removable memory 1108 and/or removable memory 1010. The non-removable memory 1108 and/or removable memory 1110 may be collectively known as database in an embodiment. The non-removable memory 1108 can include RAM, ROM, flash memory, a hard disk, or other well-known memory storage technologies. The removable memory 1110 can include flash memory, smart cards, or a Subscriber Identity Module (SIM). The one or more memory components can be used for storing data and/or code for running the operating system 1104 and the applications 1106.

The electronic device 1100 may further include a user identity module (UIM) 1112. The UIM 1112 may be a memory device having a processor built in. The UIM 1112 may include, for example, a subscriber identity module (SIM), a universal integrated circuit card (UICC), a universal subscriber identity module (USIM), a removable user identity module (R-UIM), or any other smart card. The UIM 1112 typically stores information elements related to a mobile subscriber. The UIM 1112 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA), or with fourth-generation (4G) wireless communication protocols such as LTE (Long-Term Evolution).

The electronic device 1100 can support one or more input devices 1120 and one or more output devices 1130. The input devices 1120 and the output devices 1130 configure the input/output (I/O) module for the electronic device 1100. Examples of the input devices 1120 may include, but are not limited to, a touch screen/a display screen 1122 (e.g., capable of capturing finger tap inputs, finger gesture inputs, multi-finger tap inputs, multi-finger gesture inputs, or keystroke inputs from a virtual keyboard or keypad), a microphone 1124 (e.g., capable of capturing voice input), a camera module 1126 (e.g., capable of capturing still picture images and/or video images) and a physical keyboard 1128. Examples of the output devices 1130 may include, but are not limited to a speaker 1132 and a display 1134. Other possible output devices can include piezoelectric or other haptic output devices. Some devices can serve more than one input/output function. For example, the touch screen 1122 and the display 1134 can be combined into a single input/output device.

A wireless modem 1140 can be coupled to one or more antennas (not shown in the FIG. 11) and can support two-way communications between the processor 1102 and external devices, as is well understood in the art. The wireless modem 1140 is shown generically and can include, for example, a cellular modem 1142 for communicating at long range with the mobile communication network, a Wi-Fi compatible modem 1144 for communicating at short range with an external Bluetooth-equipped device or a local wireless data network or router, and/or a Bluetooth-compatible modem 1146. The wireless modem 1140 is typically configured for communication with one or more cellular networks, such as a GSM network for data and voice communications within a single cellular network, between cellular networks, or between the electronic device 1100 and a public switched telephone network (PSTN). The wireless modem 1140 may in at least one example embodiment configure the communication module of the electronic device 1100.

The electronic device 1100 can further include one or more input/output ports 1150, a power supply 1152, one or more sensors 1154 for example, an accelerometer, a gyroscope, a compass, or an infrared proximity sensor for detecting the orientation or motion of the electronic device 1100, a transceiver 1156 (for wirelessly transmitting analog or digital signals) and/or a physical connector 1160, which can be a USB port, IEEE 1294 (FireWire) port, and/or RS-232 port. The illustrated components are not required or all-inclusive, as any of the components shown can be deleted and other components can be added.

Various example embodiments offer, among other benefits, techniques for facilitating user access to enterprise related data stored in a plurality of data stores. The embodiments disclosed herein provide a single integrated interface that combines multiple accesses and responses to information stored in multiple data/knowledge sources. The disclosed embodiments enable an easy look up to enterprise catalog and associated data in a conversational form. Further, the various techniques disclosed herein enable the user to provide a request for information in a conversational form to a virtual assistant using natural language text or voice, or a click-based request, thereby requiring minimal expertise on behalf of the user.

Further, the methods and systems described herein provide the user with the multiple responses such as specific answers, virtual assistant response, recommendations and personalization. Further, an easy access to enterprise data, metadata catalog and computed information, through a human friendly interface, to users of a data platform of an enterprise such as business analyst results in democratization of the access to information in an enterprise.

The provisioning of recommendations of catalog and data together help process more analysis on the data. Moreover, word search index provides sub-word search based on catalog. Embodiments also disclose providing auto-complete feature to the typed queries based on the learnt models and auto adding to the recommendations fields of the knowledge base.

Although the invention has been described with reference to specific exemplary embodiments, it is noted that various modifications and changes may be made to these embodiments without departing from the broad spirit and scope of the invention. For example, the various operations, modules, etc., described herein may be enabled and operated using hardware circuitry (for example, complementary metal oxide semiconductor (CMOS) based logic circuitry), firmware, software and/or any combination of hardware, firmware, and/or software (for example, embodied in a machine-readable medium). For example, the systems and methods may be embodied using transistors, logic gates, and electrical circuits (for example, application specific integrated circuit (ASIC) circuitry and/or in Digital Signal Processor (DSP) circuitry).

Particularly, the system 150 and its various components may be enabled using software and/or using transistors, logic gates, and electrical circuits (for example, integrated circuit circuitry such as ASIC circuitry). Various embodiments of the invention may include one or more computer programs stored or otherwise embodied on a computer-readable medium, wherein the computer programs are configured to cause a processor or computer to perform one or more operations (for example, operations explained herein with reference to FIG. 10). A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein. In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash memory, RAM (random access memory), etc.). Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

Various embodiments of the invention, as discussed above, may be practiced with steps and/or operations in a different order, and/or with hardware elements in configurations, which are different than those which, are disclosed. Therefore, although the invention has been described based upon these exemplary embodiments, it is noted that certain modifications, variations, and alternative constructions may be apparent and well within the spirit and scope of the invention.

Although various exemplary embodiments of the invention are described herein in a language specific to structural features and/or methodological acts, the subject matter defined in the appended claims is not necessarily limited to the specific features or acts described above. Rather, the specific features and acts described above are disclosed as exemplary forms of implementing the claims.

What is claimed is:

1. A computer-implemented method, comprising:
generating, by a processing engine, a catalog of data and metadata from enterprise related data stored in a plurality of data stores;
causing, by the processing engine, display of a user interface (UI) on an electronic device associated with a user, the UI configured to provide a plurality of query options to query the catalog of data and metadata, wherein at least one query option from among the plurality of query options is configured to enable the user to provision a click-based request for information using the UI;
receiving, by the processing engine, the query provided by the user using a query option from among the plurality of query options;
facilitating, by the processing engine, a processing of the query received from the user;
selecting, by the processing engine, a node from among a plurality of nodes in a knowledge graph, wherein the node corresponds to noun of the query;
traversing, by the processing engine, the knowledge graph along at least one edge associated with the selected node based on the query to select another node corresponding to a response to the query; and
causing, by the processing engine, display of the response on the UI based on the other selected node of the knowledge graph, the response selected by the processing engine from among a plurality of response options.

2. The method as claimed in claim 1, wherein the plurality of query options comprises at least one of:
an option to provide a natural language typed input corresponding to the query,
and an option to provision the query in conversational speech form.

3. The method as claimed in claim 1, wherein the plurality of response options comprises at least one of:
an option to provide a specific answer as response to the query,
an option to provide personalization based on user preferences, and
an option to provide a recommendation to the user.

4. The method as claimed in claim 3, wherein provisioning of personalization based on user preferences comprises performing at least one of:
repeating a sequence of tasks based on learnt user behavior,
displaying preferred joins, filters, aggregates and derived attributes applicable to the user,
displaying suggestions on search query terms, sentences, questions and catalog word searches, and
displaying preferred naming schemes for functionalities accessed by the user.

5. The method as claimed in claim 3, wherein the providing the recommendation comprises providing additional information on datasets, columns and expressions associated with a current context of the query.

6. The method as claimed in claim 3, wherein the recommendation is provided based on learning from at least one of user behavior and behavior of one or more users similar to the user.

7. The method as claimed in claim 1, further comprising:
provisioning, by the processing engine, one or more parser packages for facilitating querying of the catalog of data and metadata.

8. The method as claimed in claim 1, further comprising:
facilitating, by the processing engine, auto-completion of the query being input by the user on the UI.

9. The method as claimed in claim 1, wherein the UI is configured to enable sub-word search feature to facilitate querying of the catalog of data and metadata.

10. The method as claimed in claim 1, wherein processing the query comprises:
parsing the query to generate a plurality of query elements;
performing a grammar-based analysis of the plurality of query elements;
generating an expression based on the grammar-based analysis of the plurality of query elements; and
querying the catalog using the expression to determine the response to the query.

11. The method as claimed in claim 1, wherein the enterprise related data comprises structured data and unstructured data, and wherein the plurality of data stores comprises at least one of: one or more relational databases, one or more file systems, one or more on-premise data storage systems, and one or more cloud-based data storage systems.

12. An information retrieval system, comprising:
- a knowledge base configured to comprise enterprise related data imported from a plurality of data stores related with an enterprise;
- at least one processing engine communicably coupled with the knowledge base; and
- a memory having stored therein machine executable instructions, that when executed by the at least one processing engine, cause the information retrieval system to:
- generate a catalog of data and metadata from the enterprise related data stored in the knowledge base;
- cause display of a user interface (UI) on an electronic device associated with a user, the UI configured to provide a plurality of query options to query the catalog of data and metadata, wherein at least one query option from among the plurality of query options is configured to enable the user to provision a click-based request for information using the UI;
- receive the query provided by the user using a query option from among the plurality of query options;
- facilitate processing of the query received from the user;
- select a node from among a plurality of nodes in a knowledge graph, wherein the node corresponds to noun of the query;
- traverse the knowledge graph along at least one edge associated with the selected node based on the query to select another node corresponding to a response to the query; and
- cause display of the response on the UI based on the other selected node of the knowledge graph, the response selected by the processing engine from among a plurality of response options.

13. The method as claimed in claim 1, wherein the plurality of query options comprises at least one of:
- an option to provide a natural language typed input corresponding to the query, and
- an option to provision the query in conversational speech form.

14. The information retrieval system as claimed in claim 12, wherein the plurality of response options comprises at least one of:
- an option to provide a specific answer as response to the query,
- an option to provide personalization based on user preferences, and
- an option to provide a recommendation to the user.

15. The information retrieval system as claimed in claim 14, wherein the recommendation is provided based on learning from at least one of user behavior and behavior of one or more users similar to the user.

16. The information retrieval system as claimed in claim 12, wherein the information retrieval system is further caused to:
- provision one or more parser packages for facilitating querying of the catalog of data and metadata.

* * * * *